Patented Apr. 30, 1929.

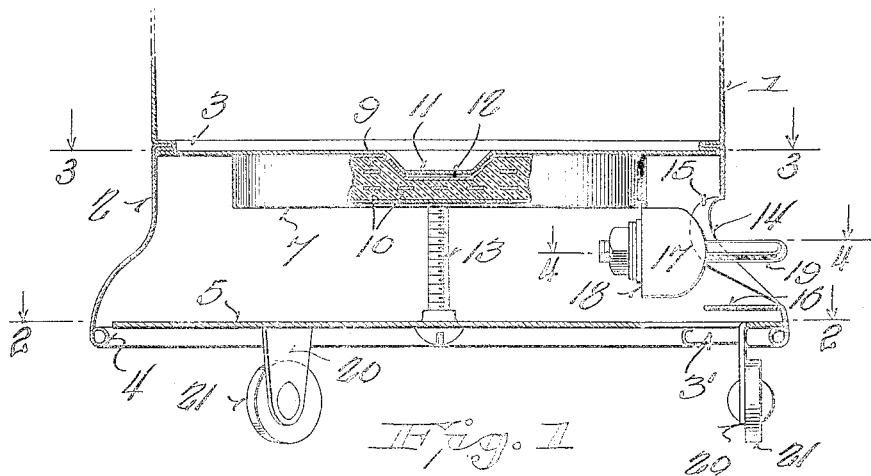
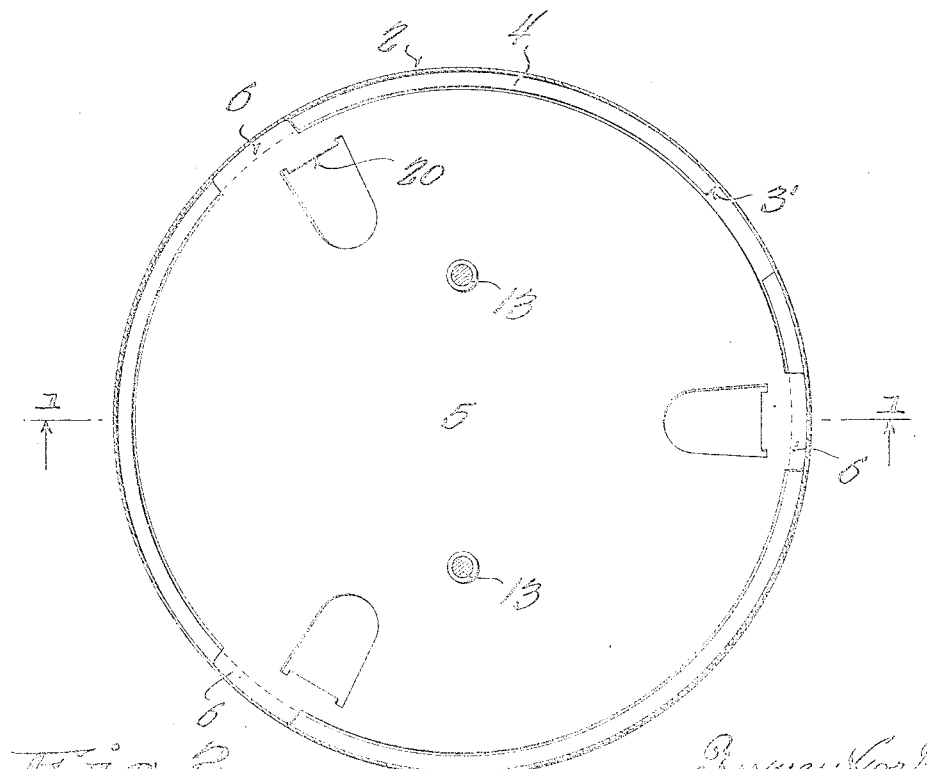

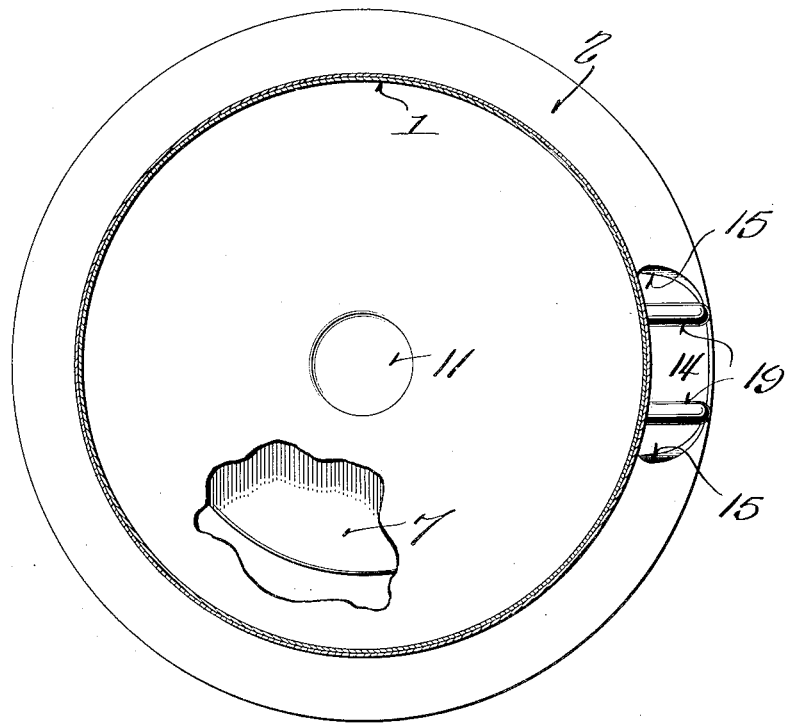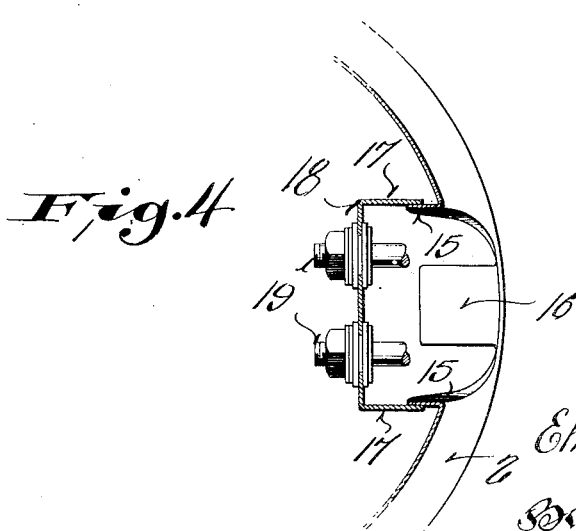

1,711,406

UNITED STATES PATENT OFFICE.

ELMER E. DRUMM, OF MANITOWOC, WISCONSIN, ASSIGNOR TO ALUMINUM GOODS MFG. CO., OF MANITOWOC, WISCONSIN, A CORPORATION OF WISCONSIN.

ELECTRICALLY-HEATED RECEPTACLE.

Application filed May 11, 1928. Serial No. 276,935.

This invention pertains to electrically heated receptacles, such as percolators, teapots, chaffing dishes, and the like.

The present invention has primarily for its object to improve devices of the foregoing character, by the provision of a simple, and comparatively inexpensive structure, which facilitates removal, and insures proper positioning of the several elements without special effort, and permits the ready replacement of the heating element when necessary.

With the foregoing in view, a more specific object is to provide interengaging means between the electric heating element and the base of the vessel, which insures properly alining the terminal plugs of the elements with the socket receiving opening in the base, and securely retains the element against shifting.

Another object is to provide a structure of the foregoing character wherein the removable electric heating element and the bottom plate are securely locked in assembled position by the means for urging the element into intimate contact wtih the bottom of the receptacle.

A still further object resides in the novel method of assembling the bottom plate and forming the supporting legs therein.

With the above and other objects in view, which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

Figure 1 is a vertical section through a portion of a vessel constructed in accordance with the present invention, the same being taken on the line 1—1 of Figure 2.

Figure 2 is a transverse section taken on the line 2—2 of Figure 1.

Figure 3 is a similar section taken on the line 3—3 of Figure 1, and

Figure 4 is a detailed section taken on the line 4—4 of Figure 1.

Referring now more particularly to the accompanying drawings, the numeral 1 designates a vessel of any conventional structure, such as a coffee pot or tea kettle, and having secured thereto adjacent its bottom a base or annular apron 2, which, in the present instance is securely engaged within the bead 3 formed in the receptacle.

It will, however, be appreciated that the particular structure of vessel and the manner of attaching the apron may be varied, and forms no specific part of the present invention, the same being well known in the art.

The bottom of the apron 2 terminates in an annular inturned bead 4 which serves to receive the bottom plate 5, which plate is provided with spaced peripheral projections 6 adapted, when in assembled position, to engage the bead 4.

As best shown in Figure 2, the bead is provided with an interruption 3' to permit assembly of the bottom plate within the base. This is accomplished by first inserting two of the projections 6 over the bead, and passing the remaining projection through the interruption 3'. The bottom plate is thereafter slightly turned so that all of the projections 6 engage the top of the bead, retaining the plate within the base in an exceedingly simple manner.

When the bottom plate is assembled within the base 2, a closed compartment is provided in which is mounted an electric heating element 7, which may be of any conventional structure. The element disclosed in the drawing comprises a metallic casing 8 containing any suitable insulating material 9, in which is embedded the usual resistance wires 10.

As best shown in Figure 1, the heating element 7 is assembled in intimate contact with the bottom of the receptacle and is held against horizontal shifting by means of a depending projection 11 formed in the bottom of the receptacle and engaged in the recess 12 formed in the heating unit. Pressure screws 13 carried by the bottom plate 5 engage the bottom of the heating element and serve to force the same into contact with the bottom of the receptacle and at the same time force the bottom plate 5 into engagement with the bead 4 to prevent rotatable shifting of the plate.

From the foregoing it will be seen that a very simple arrangement has been provided for removably assembling the various elements, and which requires no special effort or skill in the removal operation.

In order to avoid the necessity of complicated connections between the heating element and the base, the apron 2 is provided with a socket receiving opening 14, at the sides of which are inwardly projecting lips 15 and a bottom lip 16. The lips 15 engage ears 17 carried by a depending terminal plate 18, which is secured to the electrical element 7, and which carries the terminal plugs 19 that in turn are connected in any suitable manner with the resistance 10. It will thus be seen that the heating element is securely held against rotatable shifting as well as horizontal shifting, through engagement of the lips 17 with the ears 18. It will also be obvious that this arrangement materially facilitates properly assembling and positioning of the heating element to aline the terminals 19 with the socket receiving opening 15, it being merely necessary to drop the unit into contact with the bottom of the receptacle, with the ears 18 straddling the lip 17.

The projection 11 centrally alines the unit with relation to the bottom of the receptacle, while the lips 15 insure proper alinement of the terminal plugs 19 with the opening 14. When the unit is then locked in assembled position by means of the pressure screws, shifting of the element as well as the bottom plate are avoided. Removal of the element is readily accomplished by slightly loosening the pressure screws and rotating the bottom plate 5 to release one of the projections 6 through the interruption 3 in the apron bead.

The entire device is supported by means of legs 20 formed by slotting the bottom plate 5 and bending the cutout portions downwardly. To insulate the device from a table or support, the legs 20 have secured thereto buttons 21 formed of non-conductive material.

From the foregoing it will be seen that an extremely simple, inexpensive and efficient structure has been provided, wherein the removable elements may be readily and securely assembled with minimum effort and little or no skill.

I claim:—

1. An electrically heated vessel comprising a receptacle, an annular base for the bottom of said receptacle and provided with a socket receiving opening, an electric heating unit held in intimate contact with the bottom of said receptacle, terminal prongs carried by said unit, and interengaging means between said unit and the annular base for alining said terminal prongs with said socket receiving opening.

2. An electrically heated vessel comprising a receptacle, an annular base for the bottom of said receptacle and provided with a socket receiving opening, an electric heating unit held in intimate contact with the bottom of said receptacle, terminal prongs carried by said unit, interengaging means between said unit and the annular base for alining said terminal prongs with said socket receiving opening, and pressure means for holding the heating unit in assembled position.

3. An electrically heated vessel comprising a receptacle, an annular base for the bottom of said receptacle and provided with a socket receiving opening, an electric heating unit held in intimate contact with the bottom of said receptacle, terminal prongs carried by said unit, interengaging means between said unit and the annular base for alining said terminal prongs with said socket receiving opening, a removable bottom plate for said base, and pressure means for securely holding said electrical unit and bottom plate in assembled position.

4. An electrically heated vessel comprising a receptacle, an annular base for the bottom of said receptacle and provided with a socket receiving opening, an electric heating unit held in intimate contact with the bottom of said receptacle, terminal prongs carried by said unit, means for preventing horizontal shifting of said electrical unit with relation to said vessel, and means carried by said base for engaging said electric unit to aline said terminal prongs with said socket receiving opening and prevent radial shifting of said unit.

5. An electrically heated vessel comprising a receptacle, an annular base for the bottom of said receptacle and provided with a scoket receiving opening, an electric heating unit held in intimate contact with the bottom of said receptacle and having a centrally disposed recess, a depending projection in the bottom of the receptacle adapted to be received in the recess, terminal prongs carried by said unit, and interengaging means between said unit and the annular base for aligning said terminal prongs with said socket receiving opening.

6. An electrically heated vessel comprising a receptacle, an annular base for the bottom of the receptacle and provided with a socket receiving opening, an electric heating unit held in intimate contact with the bottom of the receptacle, terminal prongs carried by the unit, lips extending inwardly from the opposite sides of the opening in the base and spaced ears supported from the heating unit and arranged upon opposite sides of the prongs for inter-engagement with the lips on the base to align the terminal prongs with the socket receiving opening.

7. An electrically heated vessel comprising a receptacle, an annular base for the bottom of said receptacle and provided with a socket receiving opening, an electric heating unit engaging the bottom of said receptacle, a terminal plate carried by said heating unit, terminal plugs carried by said plate, and interengaging means between said plate and said base for alining said terminal plugs with said socket receiving opening.

In testimony that I claim the foregoing I have hereunto set my hand at Manitowoc, in the county of Manitowoc and State of Wisconsin.

ELMER E. DRUMM.